United States Patent [19]
Cheng

[11] 3,986,836
[45] Oct. 19, 1976

[54] CARBON BLACK REACTOR
[75] Inventor: Paul J. Cheng, Bartlesville, Okla.
[73] Assignee: Phillips Petroleum Company, Bartlesville, Okla.
[22] Filed: Apr. 29, 1974
[21] Appl. No.: 464,953

Related U.S. Application Data
[63] Continuation-in-part of Ser. No. 285,115, Aug. 31, 1972, abandoned.

[52] U.S. Cl. .............................. 23/259.5; 423/456; 423/450
[51] Int. Cl.² ...................... C09C 1/50; C01B 49/00
[58] Field of Search .......... 23/259.5; 423/450, 455, 423/456, 457

[56] References Cited
UNITED STATES PATENTS

| | | | |
|---|---|---|---|
| 2,292,355 | 8/1942 | Ayers | 23/259.5 X |
| 3,619,138 | 11/1971 | Gunnell | 23/259.5 X |
| 3,701,827 | 10/1972 | Dahmen | 423/456 |
| 3,728,437 | 4/1973 | Vanderveen | 23/259.5 X |

FOREIGN PATENTS OR APPLICATIONS

| | | | |
|---|---|---|---|
| 1,095,963 | 6/1955 | France | 423/456 |

*Primary Examiner*—James H. Tayman, Jr.

[57] ABSTRACT

A carbon black apparatus is disclosed wherein a hydrocarbon feedstock is axially introduced into a tubular reactor at one end, carbon black-bearing smoke is withdrawn at the other end, a first vortex of hot combustion gases is created around the hydrocarbon feedstream, and wherein a second vortex is created upstream with respect to the first vortex, said second vortex being created under such conditions as to exert an aspirating effect on the gases of the first vortex so that an axial prolongation of the zone of hot combustion gases of the first vortex moving around the hydrocarbon feedstream is created upstream of the first vortex.

16 Claims, 2 Drawing Figures

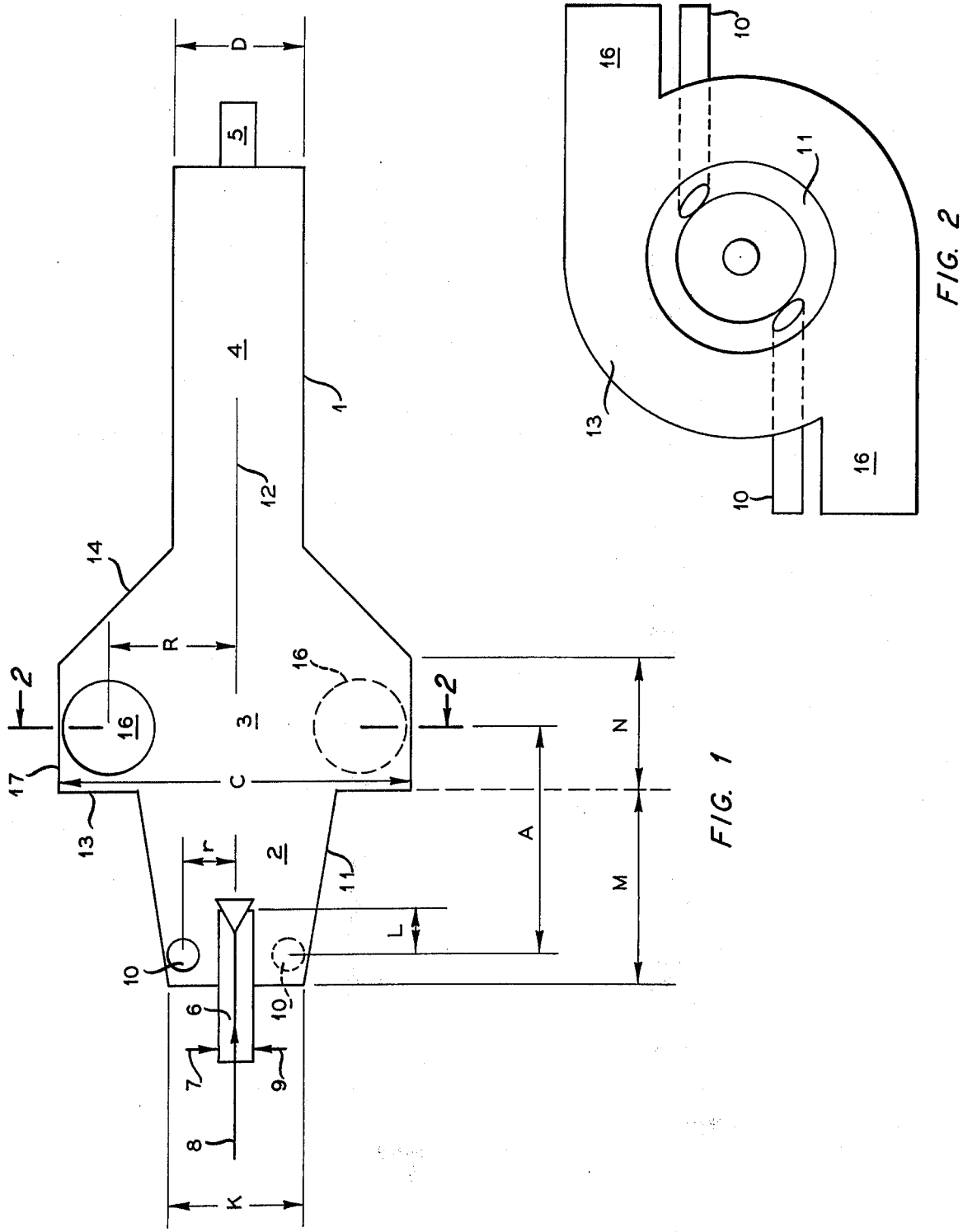

CARBON BLACK REACTOR

This application is a continuation-in-part of copending application Ser. No. 285,115, filed Aug. 31, 1972 and now abandoned.

This invention relates to the production of carbon black from hydrocarbons by pyrolytical decomposition thereof.

In one of its more specific aspects this invention relates to a carbon black process and reactor in which there is generated a circular jet and reverse flow of combustion gases.

BACKGROUND OF THE INVENTION

It is known in the art that carbon black can be produced by axially introducing a hydrocarbon feedstream into a tubular reactor at one end and creating a vortex of hot combustion gases surrounding said feedstock so as to decompose the hydrocarbon and form a hydrocarbon-bearing smoke which can be recovered at the other end of the tubular reactor. This method has proven to be very successful. However, there is still a demand for carbon black having a further improved structure. The production of high structure furnace black is highly desirable because of the easy processing of rubber compositions containing the black. It is believed that the existence of a high temperature shield surrounding the hydrocarbon feed core is one of the most important conditions required for high structure black production.

Structure is a measure for the degree of internodular fusion or aggregate size. High structure means that there is a high number of carbon black nodules fused together to form one particle, whereas low structure means that there are only a few carbon black nodules fused together to form one particle.

THE INVENTION

It is thus an object of this invention to provide a process for the production of carbon black.

A further object of this invention is to provide a process for the production of high structure carbon black.

Another object of this invention is to provide a new carbon black reactor.

Still another object of this invention is to provide a hydrocarbon reactor which can be used to create an axially long high temperature shield surrounding the hydrocarbon feed.

Still a further object of this invention is to provide a hydrocarbon reactor which can be used to produce high structure carbon black.

Other aspects, objects and advantages of this invention will become apparent to one skilled in the art from the description of the preferred embodiments of the invention, the drawing and the attached claims.

In accordance with one embodiment of this invention there is now provided a carbon black process wherein a hydrocarbon feedstream is axially introduced into the first end of a tubular reactor, a first vortex is created by causing a circular movement of hot combustion gases around said axial hydrocarbon feedstream at a first velocity around the longitudinal axis of the tubular reactor, the carbon black-bearing smoke is removed from the reactor, and wherein the process further comprises the improvement of creating a second vortex having the same directional sense as the first vortex by causing a circular spinning movement of gases around the hydrocarbon feed at a location between the locus of creation of the first vortex and the first end of the reactor and by moving these gases at the locus of creation of the vortex at a second velocity around the longitudinal axis of the reactor, the second velocity being considerably higher than the first velocity of the hot combustion gases but moving in the same directional sense of rotation as the gases creating the first vortex.

Velocity in this context is to be understood as the circumferential component of the velocity of the gas stream at the location of the creation of the vortex; in the preferred case of tangential introduction this velocity is the linear velocity of the gases introduced into the reactor. The second velocity for the gases of the second vortex is preferably near to sonic speed and about 50 to about 600 percent higher than the respective first velocity of the hot combustion gases. In other words, the second circular velocity for the second vortex at the location of its creation should preferably be about 1.5 to 7 times the first circular velocity of the hot combustion gases at the location of the creation of the first vortex.

The words "upstream" and "downstream" should refer to the direction of flow of hydrocarbon feed. Thus, the first end of the tubular reactor where the hydrocarbon is introduced into the reactor is also called the upstream end. The word "tangential" should refer to a direction of introduction of gases approximately tangential to a circle drawn around the longitudinal axis of the reactor having a radius which equals the distance between the center of introduction of the gases and the longitudinal axis. If the gases are introduced at more than one locus the directions of introduction are such that the same sense of circular motion around the axis of the reactor is created.

It is believed that the second vortex with its high speed gases causes a strong suction effect on the spinning gases of the first vortex, thus increasing in upstream direction the length of the portion where the hot combustion gases surround the hydrocarbon feedstream like a cylinder as a high temperature shield. By the process and apparatus of this invention the axial momentum of the high speed circular jet is reduced and an effective, reverse flow, high temperature shield is created around the axially introduced hydrocarbon feed core.

To create the second vortex with the high circumferential speed it is presently preferred to use oxygen or oxygen containing gases. The quantity of gas used preferably is such that up to about 15 percent of the total oxygen is introduced by the gases creating the second vortex.

This invention also provides a reactor in which there is established a circular jet-generated reverse flow of the type required for high structure black production.

In accordance with a further embodiment of this invention there is also provided a longitudinally disposed carbon black reactor with tubular-shaped interior which comprises an upstream or first end, an aspiration or axial section connected therewith, in open connection and axial alignment therewith a combustion section, in open connection and axial alignment therewith a reaction section, a downstream or second end connected with said reaction section, said reactor further comprising first means for the axial introduction of hydrocarbon feed into the aspiration or axial section, second means for the tangential introduction of combustion gases at a first velocity into the combustion section to create a first vortex surrounding the hydrocarbon feed stream, third means for tangential introduction of gas at a second velocity considerably higher than the first velocity into the aspiration or axial section for creating a second vortex surrounding the hydrocarbon feedstream and having the same rotational sense as the first vortex, and having recovery means for the recovery of the hydrocarbon-bearing smoke leaving the downstream end of the reactor.

The presently preferred reactor has an axial or aspiration section having sides diverging outwardly from the horizontal axis in the downstream direction and a combustion section having its downstream walls adapted for angular convergence to the longitudinal axis of the reactor in a downstream direction. The terms "diverging" and "converging" refer to the interior shape of the walls or sides defining the different sections of the reactor.

The presently preferred reactor is provided with an inlet hydrocarbon feed discharge conduit upstream of which there is positioned at least one port for the tangential introduction of reactants into the axial or aspiration section at a rate sufficient to aspirate at least a portion of those reactants introduced into the combustion section upstream into the axial or aspiration section.

Employing the reactor described, a jet of air or oxygen is introduced tangentially at or near sonic velocity upstream of the discharge from the hydrocarbon feed conduit to establish a circular jet; this jet creates a very low pressure upstream of the locus of hydrocarbon introduction. The axial momentum of the circular jet is small because of its tangential introduction. As a result, at least a portion of the gases introduced into the combustion section is aspirated into the axial zone. These combustion gases mix with the high speed circular jet and the entire mass thus formed envelops the feed core along its longitudinal axis as a high temperature shield. The amount of air or oxygen introduced to create the circular jet and aspirating effect is from about 5 to about 20 volume-percent of the total oxygen-containing stream introduced into the reactor.

The walls of the axial zone diverge in a downstream direction from the longitudinal axis of the reactor (half angle) by about 10°, preferably from about 3° to about 6°, from the horizontal. This increases the pressure differential between the combustion zone and the upstream end of the axial zone.

The downstream walls of the combustion zone converge inwardly to the longitudinal axis of the reactor, preferably at an angle of between about 70° and about 30°. This serves to laminarize the rotational flow of those gases introduced tangentially into the combustion section so that the high temperature gas shield, created in the aspiration or axial section and surrounding the feed core, survives for a greater distance down the length of the reaction section.

The process of the present invention can be carried out employing as hydrocarbon feed, fuels and reactants such materials as are conventionally employed for those purposes. Also, as employed herein, the term "combustion gases" refers to hot combustion gases produced by the oxidation of a fuel, preferably natural gas, with a free oxygen-containing oxidant, preferably air, whether the hot combustion gases are produced exteriorly of the reactor or are produced within the reactor by the introduction of fuel and the oxidant thereinto.

The process and apparatus of this invention will be more easily understood if explained in conjunction with the attached drawing which illustrates, in FIG. 1, one embodiment of the reactor in elevation and, in FIG. 2, a cross section of the reactor through section 2—2 of FIG. 1.

Referring to FIG. 1, there is shown reactor 1 comprised of aspiration section 2, combustion section 3, and reaction section 4 from which carbon black is recovered through conduit 5. Instead of an end wall with conduit 5, the reactor could be open ended followed, e.g., by a quenching zone. This quench is well known in the art (see U.S. Pat. No. 3,607,065).

Axial section 2 is adapted with hydrocarbon feed nozzle 6 through which reactants such as hydrocarbon, air and fuel can be introduced through conduits 7, 8 and 9, respectively. Nozzle 6 is adapted to discharge downstream of ports 10.

Discharging tangentially into aspiration section 2 is at least one port 10 through which very high speed jets of air and/or oxygen are introduced at or near sonic velocity. Any number of ports can be employed with at least two being preferably provided. The axial section is adapted with sides 11 which diverge outwardly in a downstream direction from the longitudinal axis 12 of the reactor.

Combustion section 3 is adapted with upstream walls 13 which are substantially perpendicular to the longitudinal center line of the reactor and with downstream walls 14 which converge inwardly to the longitudinal axis of the reactor, at an angle of about 70° maximum. Between these walls 13 and 14 a cylindrical wall portion 17 is arranged, completing the combustion section. These walls 14 intersect reaction section 4 at their downstream terminus, the reaction section having a diameter preferably less than the downstream diameter of the axial section. The combustion section is also adapted with at least one conduit 16 for the introduction of hot combustion gases. Preferably, two such conduits are employed in the method described in U.S. Pat. No. 2,564,700 to Krejci.

In one embodiment of the apparatus of this invention the reactor had an axial section 15 inches in length and a cylindrical portion of the combustion section 12 inches in length. The axial distance between the centers of the ports 16 and 10 was about 20 inches. The diameter of the reaction section was 12 inches and the diameter of the combustion section was 38 inches. The distance R between the center of the tangential ports 16 and the longitudinal axis was 13 inches. The feed inlet nozzle discharged downstream of the inlet ports into the axial section at a distance of 5 inches, the axial section being 10 inches in diameter at its upstream end. The distance r between the center of ports 10 and the longitudinal axis was 4 inches. The walls of the axial zone diverged outward from the horizontal axis of the reactor at an angle of 4° and the downstream walls of the precombustion zone converged inwardly toward the longitudinal axis at an angle of 45°. The diameters of the tangential ducts 16 and 10 were about 12 inches and 1.0 inches respectively.

The apparatus of the present invention can be of various dimensions but it will preferably be of dimensions within the following ranges:

A/D is from about 0.7 to about 2.1
K/D is from about 0.6 to about 1.0
M/D is from about 0.5 to about 1.5

L/M is from about 0.2 to about 0.9
N/D is from about 0.5 to about 1.2
R/r is from about 1.25 to about 6 in which K is the upstream diameter of the axial or aspiration section; L is the axial distance between the center of the tangential ports of the axial or aspiration zone for introduction of a gas to create the second vortex and the hydrocarbon feed nozzle outlet; M is the length of the axial section from the center of the tangential ports 10 to the downstream end of the axial or aspiration section; N is the length of the combustion section; D is the diameter of the reaction section; A is the axial distance between the center of the tangential ports 16 for the introduction of the hot combustion gases to create the first vortex and the center of the tangential ports 10 for the introduction of the second gas to create the second vortex; R is the distance of the center of the tangential ports 16 to the longitudinal axis of the reactor; and r is the distance of the center of the tangential ports 10 to the longitudinal axis of the reactor. It is preferred that the diameter D of the reaction section 4 be between about 4 and about 15 inches and that the diameter C of the combustion section be between about 15 and about 45 inches.

For the reactor described above the following run was calculated. The figures given below refer to the stream by the reference numerals of the drawing.

| | Feed Streams | |
|---|---|---|
| (10) | Air (velocity 900 ft./sec.) scf/h | 35,000 |
| (16) | Air & natural gas (15/1 vol. ratio) combustion gases, scf/h (velocity 250 ft./sec.) | 240,000 |
| (8) | Make oil (120 BMCI, 800° F ave. B.P.), gal./h | 300 |
| (9) | Axial air (around oil pipe 8), scf/h | 4,000 |
| Product Characteristics for the Carbon Black: | | |
| | $N_2SA$, $M^2$/gm | 100 |
| | DBP, cc/100 gm | 115 |
| | Photelometer | 90 |

The locus for the quenching operation is assumed to be 9 feet apart from the inlet end of the axial or aspiration section. BMCI refers to the Bureau of Mines correlation index to characterize the make oil. $N_2SA$ refers to the surface area in square meters per gram measured by nitrogen adsorption. DBP refers to the structure of the carbon black and is measured by the absorption of dibutyl phthalate measured after compression of the sample of carbon black by a pressure of 24,000 psi for 4 times in accordance with U.S. Pat. No. 3,548,454. Photelometer refers to the standard method of determining the oil content of the black, 100 referring to 0 oil content and 0 meaning a very high oil content of the carbon black.

The reaction temperature in the carbon black reactor lies in the range of 2400° to 2800° F, the pressure being slightly above atmospheric pressure sufficient to make the gases and liquids flow in the system. It is believed that by the process and apparatus of the present invention the structure is increased by about 3 to about 5 percent (DBP, cc/gm). This increase is a significant advance in this well-developed technology.

Reasonable variations and modifications, which will be apparent to those skilled in the art, can be made to this invention without departing from the spirit and scope thereof.

What is claimed is:

1. A longitudinally disposed axial carbon black reactor with a tubular interior comprising
   a. an aspiration section defined by a first slightly divergent frustoconical wall,
   b. in open connection and axial alignment therewith a combustion section defined by second walls comprising
      aa. a first portion connected to said first frustoconical wall, said first portion diverging more than said first frustoconical wall,
      bb. a second converging portion,
   c. in open connection and axial alignment with said second converging portion of said second wall a carbon black formation section defined by third walls,
   d. first means for the axial introduction of hydrocarbon feed into said aspiration section, said first means being positioned substantially at the axis of the reactor,
   e. third means for tangential introduction of hot combustion gas into said combustion section at a first velocity, said third means being positioned in the vicinity of said second walls to form a first vortex of hot combustion gas around the axial hydrocarbon feed,
   f. second means for the tangential introduction of a gas into said aspiration section at a second velocity considerably higher than said first velocity, said second means being positioned in the vicinity of said first slightly divergent frustoconical wall to form a second gas vortex of the same rotational sense as the first vortex around the hydrocarbon feed,
   g. carbon black recovery means connected to said carbon black formation section.

2. A reactor in accordance with claim 1 wherein a first end wall is connected to said first slightly divergent frustoconical wall, wherein said first portion diverges in downstream direction forming an angle with the longitudinal axis of the reactor of up to 90° and wherein said second walls comprise a third cylindrical portion between said first portion and said second portion.

3. A reactor in accordance with claim 1 in which the walls of said aspiration section diverge outwardly at an angle within the range of from about 3° to about 6°.

4. A reactor in accordance with claim 1 in which said second converging portion of said combustion section converges inwardly at an angle within the range of from about 20° to about 70°.

5. A reactor in accordance with claim 4 in which said second converging portion converges inwardly at an angle within the range of from about 30° to about 70°.

6. A reactor in accordance with claim 1 in which
   K/D is from about 0.6 to about 1.0,
   M/D is from about 0.5 to about 1.5;
   L/M is from about 0.2 to about 0.9;
   N/D is from about 0.5 to about 1.2
wherein K represents the upstream diameter of the aspiration section; L is the distance between the locus of discharge of said second means and the locus of discharge of said first means, said second means being located upstream of said first means; M is the length of said aspiration section; D is the diameter of said carbon black formation section; and N is the length of said combustion section.

7. A reactor in accordance with claim 6 in which the walls of said aspiration section diverge outwardly at an angle within the range of from about 3° to about 6°.

8. A reactor in accordance with claim 6 in which said second converging portion of said combustion section converges inwardly at an angle within the range of from about 70° to about 30°.

9. A reactor in accordance with claim 7 in which said second converging portion of said combustion zone converges inwardly at an angle within the range of from about 70° to about 30°.

10. A reactor in accordance with claim 1 wherein the interior of the tubular reactor in the aspiration section forms an angle of less than about 10° with the longitudinal axis of the reactor.

11. A reactor in accordance with claim 1 wherein the connections between the walls and wall portions are streamlined.

12. A reactor in accordance with claim 10 wherein the first wall diverges at an angle within the range from about 3° to about 6° to the longitudinal axis of the reactor.

13. A reactor in accordance with claim 1 wherein said second converging section of the combustion section forms an angle with the longitudinal axis of the reactor in the range from about 20° to about 60°.

14. A reactor in accordance with claim 1 in which
A/D is from about 0.7 to about 2.1;
K/D is from about 0.6 to about 1.0;
M/D is from about 0.5 to about 1.5;
L/M is from about 0.2 to about 0.9;
N/D is from about 0.5 to about 1.2;
R/r is from about 1.25 to about 6
wherein K is the upstream diameter of the aspiration section; L is the axial distance between the locus of discharge of the gas for creating the second vortex and the locus of discharge of the hydrocarbon feed, the locus of discharge of the gas being located upstream of the locus of discharge of the hydrocarbon feed; M is the length of the aspiration section from the center of the outlet of said gas to the downstream end of the aspiration section; D is the diameter of the carbon black formation section; N is the length of the combustion section; A is the axial distance between the locus of creation of the first vortex and the locus of creation of the second vortex; R is the distance of the outlet for the combustion gases into the reactor from the longitudinal axis; and r is the distance of the center of the outlet of the gas for the creation of the second vortex from the longitudinal axis of the reactor.

15. A reactor in accordance with claim 1 in which the first wall diverges outwardly from the longitudinal axis in downstream direction at an angle within the range of from about 3° to about 6°.

16. A reactor in accordance with claim 1 wherein said second converging portion frustoconically converges inwardly at an angle to the longitudinal axis of the reactor within the range of from about 20° to about 60°.

* * * * *